United States Patent Office 3,128,282
Patented Apr. 7, 1964

3,128,282
11-OXYGENATED 17α,21-DIHYDROXY - 3 - OXA-A-HOMOPREGN - 4a - ENE - 4,20 - DIONES, ESTERS THEREOF, AND INTERMEDIATE THERETO
Raphael Pappo, Skokie, Ill., assignor to G. D. Searle & Co., Chicago, Ill., a corporation of Delaware
No Drawing. Filed Feb. 2, 1962, Ser. No. 170,804
6 Claims. (Cl. 260—340.9)

The present invention relates to novel 7-membered A-ring lactones of the pregnane series, and especially to 11 - oxygenated 17α,21 - dihydroxy - 3 - oxa - A - homopregn-4a-ene-4,20-diones and esters thereof, which can be represented by the structural formula

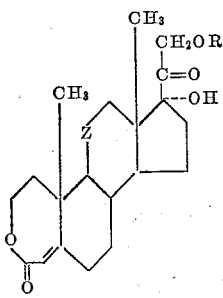

wherein R is hydrogen or a lower alkanoyl radical and Z is a carbonyl or β-hydroxymethylene radical.

Other esters also suitable for the purposes of this invention are exemplified by the compounds wherein R above is symbolic of a 2-cyclopentylpropionyl, 2-carboxypropionyl, or dihydroxyphosphinyloxy

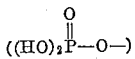

radical.

The lower alkanoyl radicals referred to above are exemplified by formyl, acetyl, propionyl, butyryl, valeryl, caproyl, and the branched-chain isomers thereof.

The compounds of the present invention are conveniently prepared by utilizing as a starting material, 17,20;20,21 - bismethylenedioxypregn - 4 - ene - 3,11 - dione, the preparation of which is described by R. E. Beyler et al., J.A.C.S., 80, 1517 (1958). Reaction of that substance with a suitable brominating agent such as N-bromosuccinimide in carbon tetrachloride affords the corresponding 6-bromo derivative. Treatment of that compound with potassium acetate in acetic acid results in 2α-acetoxy-17,20;20,21-bismethylenedioxypregn-4-ene-3,11-dione, and hydrolysis of this acetate, suitably with aqueous potassium hydroxide in methanol-chloroform, affords the corresponding 2α-hydroxy substance. Cleavage of the latter compound with periodic acid in aqueous pyridine affords 17,20;20,21-bismethylenedioxy-2,11-dioxo-2,3-secopregn-4-en-3-oic acid. Reduction of this acid, suitably with aqueous sodium borohydride, affords the corresponding 2,11β-dihydroxy substance. The latter hydroxy-acid is heated in benzene solution, resulting in ring closure to produce 17,20;20,21-bismethylenedioxy-11β-hydroxy-3-oxa-A-homopregn-4a-en-4-one. Removal of the bismethylenedioxy protecting group by heating with aqueous formic acid yields 11β,17α,21-trihydroxy-3-oxa-A-homopregn-4a-ene-4,20-dione.

Oxidation of the aforementioned 17,20;20,21-bis-methylenedioxy - 11β - hydroxy - 3 - oxa - A - homopregn - 4a-en-4-one, suitably with chromic acid in acetone, affords the corresponding 11-oxo compound, which is heated with aqueous formic acid to afford the instant 17α,21-dihydroxy-3-oxa-A-homopregn-4a-ene-4,11,20-trione.

The 21-esters of this invention can be obtained by acylation of the corresponding 21-hydroxy compounds. As a specific example, 11β,17α,21-trihydroxy-3-oxa-A-homopregn-4a-ene-4,20-dione is allowed to react with acetic anhydride in pyridine to afford 21-acetoxy-11β,17α-dihydroxy-3-oxa-A-homopregn-4a-ene-4,20-dione.

Equivalent to the lactones of this invention are the corresponding hydroxy-acids and alkali metal salts thereof, which are represented by the formula

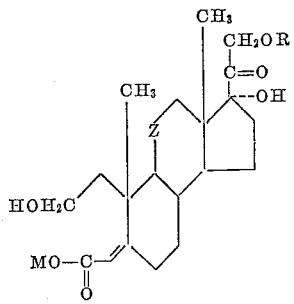

wherein R and Z have the identical meanings designated above and M is hydrogen or the metallic ion of an alkali metal hydroxide.

The compounds of the present invention display valuable pharmacological properties. They are, for example, potent anti-inflammatory agents. It is apparent that the instant 17,20;20,21-bismethylenedioxy-2,11-dioxo-2,3-secopregn-4-en-3-oic acid is useful as an intermediate in the manufacture of the pharmacologically-active compounds of this invention.

The invention will appear more fully from the following examples, which are not to be construed, however, as limiting the invention either in spirit or in scope. Many modifications in materials and methods will be apparent to those skilled in the art. In these examples, temperatures are given in degrees centigrade (° C.), and quantities of materials are expressed in parts by weight unless otherwise noted.

*Example 1*

A solution of 15 parts of 17,20;20,21-bismethylenedioxypregn-4-ene-3,11-dione in 1560 parts of carbon tetrachloride is distilled until about 320 parts of solvent is collected. To this dried solution is added 6.67 parts of N-bromosuccinimide, and the reaction mixture is heated at reflux for about 50 minutes, while being irradiated with infrared rays, then is cooled to room temperature, washed successively with aqueous sodium sulfite and water, dried over anhydrous sodium sulfate, and concentrated to dryness in vacuo. The residue is recrystallized from benzene-ether to yield 6-bromo-17,20;20,21-bismethylenedioxypregn-4-ene-3,11-dione, M.P. about 167–171°.

A solution of 6-bromo-17,20;20,21-bismethyenedioxypregn-4-ene-3,11-dione in 289 parts of acetic acid containing 28 parts of potassium acetate is heated at reflux for about one hour, then is cooled and concentrated to dryness at reduced pressure. The residue is partitioned between water and benzene, and the benzene layer is separated, washed successively with dilute aqueous sodium hydroxide and water, dried over anhydrous sodium sulfate, and evaporated to dryness at reduced pressure. Recrystallization from benzene affords 2α-acetoxy-17,20;20,21-bismethylenedioxypregn-4-ene-3,11-dione, M.P. about 291–294°.

A solution of 13 parts of 2α-acetoxy-17,20;20,21-bismethylenedioxypregn-4-ene-3,11-dione in 270 parts of chloroform and 120 parts of methanol is purged of oxygen by means of a stream of nitrogen. To this solution is then added a solution of 2.2 parts of potassium hydroxide in 25 parts of water containing 8 parts of methanol, and the resulting reaction mixture is stirred at room temperature for about 15 minutes, then is neutralized with dilute aqueous acetic acid and extracted with chloroform. The organic solution is washed successively with aqueous postassium bicarbonate and water, dried over anhydrous sodium sulfate, and evaporated to dryness in vacuo. The residue is recrystallized from isopropyl alcohol to afford 2α-hydroxy-17,20;20,21-bismethylenedioxypregn-4-ene-3,11-dione, M.P. about 248–251°.

Example 2

To a solution of one part of 2α-hydroxy-17,20;20,21-bismethylenedioxypregn-4-ene-3,11-dione in 9.8 parts of pyridine is added a solution of 0.6 part of paraperiodic acid in 4 parts of water, and this reaction mixture is stored at room temperature for about 16 hours, then is extracted with chloroform. The organic layer is washed successively with water and aqueous potassium carbonate then is extracted with ice-cold 5% aqueous sodium hydroxide. The alkaline extract is acidified by the addition of excess acetic acid, and the precipitated product is extracted into chloroform. This chloroform solution is washed with water, then is evaporated to dryness under nitrogen to produce pure 17,20;20,21-bismethylenedioxy-2,11-dioxo-2,3-secopregn-4-en-3-oic acid, M.P. about 212–213°. It is represented by the structural formula

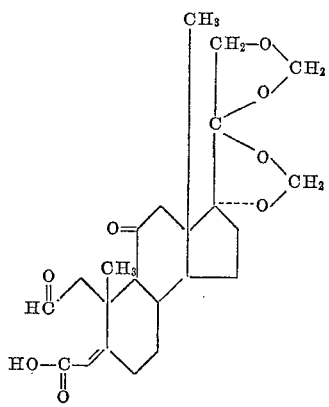

Example 3

A mixture of one part of 17,20;20,21-bismethylenedioxy-2,11-dioxo-2,3-secopregn-4-en-3-oic acid, one part of sodium borohydride, and 20 parts of water is stored at room temperature for about 4 hours, then is cooled by means of an ice bath and acidified to pH 4 with cold dilute aqueous hydrochloric acid. This acidic mixture is immediately extracted with chloroform, and the organic solution is washed with water, dried over anhydrous sodium sulfate, and concentrated to dryness under nitrogen, to yield 17,20;20,21-bismethylenedioxy-2,11β-dihydroxy-2,3-secopregn-4-en-3-oic acid. This compound is represented by the structural formula

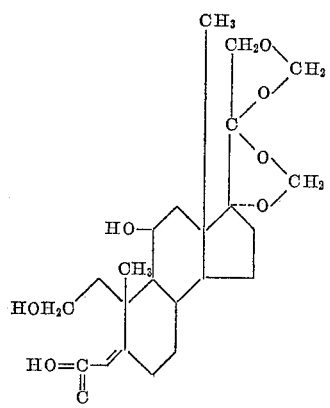

Example 4

A suspension of one part of 17,20;20,21-bismethylenedioxy-2,11β-dihydroxy-2,3-secopregn-4-en-3-oic acid in 80 parts of benzene is distilled slowly over a period of about 20 minutes, then is concentrated to dryness at reduced pressure. The residue is extracted with chloroform, and the organic extract is washed successively with 5% aqueous potassium carbonate solution and water, dried over anhydrous sodium sulfate, and stripped of solvent to yield 17,20;20,21-bismethylenedioxy-11β-hydroxy-3-oxa-A-homopregn-4a-en-4-one. Recrystallization from benzene-methylene chloride affords a pure sample, M.P. about 269–273°. It is represented by the structural formula

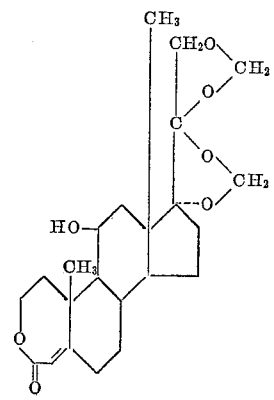

Example 5

A mixture of one part of 17,20;20,21-bismethylenedioxy-11β-hydroxy-3-oxa-A-homopregn-4a-en-4-one and 100 parts of 60% aqueous formic acid is heated on the steam bath for about 10 minutes, then is cooled and extracted with chloroform. The organic extract is washed successively with aqueous potassium bicarbonate and water, dried over anhydrous sodium sulfate, and the solvent is distilled at reduced pressure to produce 11β,17α,21 - trihydroxy-3-oxa-A-homopregn-4a-ene-4,20-dione. Recrystallization of this material first from benzene then from acetone affords a sample of the pure substance, melting at about 236–238.5°. It is represented by the structural formula

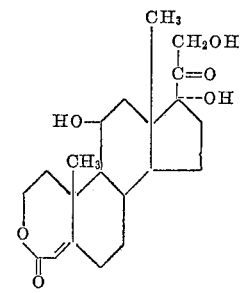

Example 6

To a solution of 4.2 parts of 17,20;20,21-bismethylenedioxy-11β-hydroxy-3-oxa-A-homopregn-4a-en-4-one in 79 parts of acetone is added 2.8 parts by volume of an aqueous solution, 8 N in chromium trioxide and 8 N in sulfuric acid. After standing at room temperature for about 5 minutes, the mixture is treated with one part of isopropyl alcohol, then is diluted with chloroform. This organic solution is washed successively with water, aqueous potassium bicarbonate, and water, then is dried over anhydrous sodium sulfate, and evaporated to dryness in vacuo to afford 17,20;20,21-bismethylenedioxy-3-oxa - A - homopregn-4a-ene-4,11-dione. Recrystallization from benzene affords a pure sample, which melts at about 267–270°. This substance is represented by the structural formula

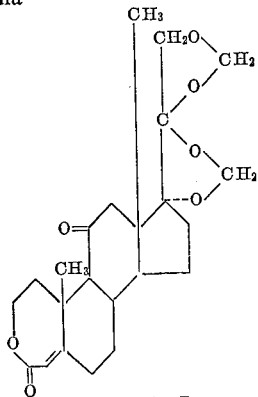

*Example 7*

A mixture of one part of 17,20;20,21-bismethylenedioxy-3-oxa-A-homopregn-4a-ene-4,11-dione with 385 parts of 50% aqueous formic acid is heated on a steam bath for about two hours. This reaction mixture is then cooled and extracted with chloroform to afford an organic solution, which is washed successively with aqueous potassium bicarbonate and water, dried over anhydrous sodium sulfate, and concentrated to dryness to yield 17α,21-dihydroxy-3-oxa-A-homopregn-4a-ene-4,11,20-trione. Recrystallization from acetone yields a pure sample, melting at about 245–247° and represented by the structural formula

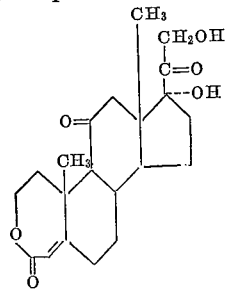

*Example 8*

A mixture of one part of 11β,17α,21-trihydroxy-3-oxa-A-homopregn-4a-ene-4,20-dione, 10 parts of acetic anhydride and 20 parts of pyridine is heated on the steam bath for about 15 minutes, then is cooled and diluted with water. The aqueous mixture is extracted with chloroform, and the organic extract is washed successively with dilute hydrochloric acid and water, then is concentrated to dryness in vacuo to yield 21-acetoxy-11β,17α-dihydroxy-3-oxa-A-homopregn-4a-ene-4,20-dione, which is represented by the structural formula

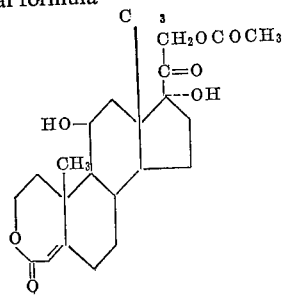

By substituting 13 parts of propionic anhydride and otherwise proceeding according to the herein-described processes, 11β,17α-dihydroxy-21-propionoxy-3-oxa-A-homopregn-4a-ene-4,20-dione is obtained.

*Example 9*

The substitution of 4.2 parts of 21-acetoxy-11β,17α-dihydroxy-3-oxa-A-homopregn-4a-ene-4,20-dione in the procedure of Example 6 results in 21-acetoxy-17α-hydroxy-3-oxa-A-homopregn-4a-ene-4,11,20-trione. It is represented by the structural formula

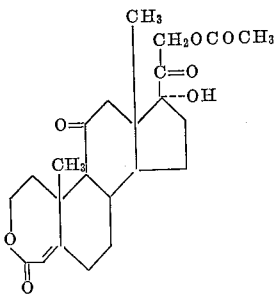

What is claimed is:
1. A compound of the formula

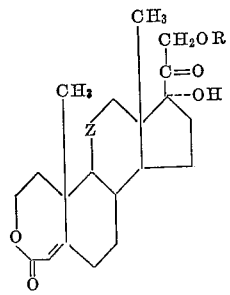

wherein R is selected from the group consisting of hydrogen and lower alkanoyl, and Z is selected from the group of radicals consisting of carbonyl and β-hydroxymethylene.

2. 11β,17α,21-trihydroxy-3-oxa-A-homopregn-4a-ene-4,20-dione.

3. 17α,21-dihydroxy-3-oxa-A-homopregn-4a-ene-4,11,20-trione.

4. 21-acetoxy-11β,17α-dihydroxy-3-oxa-A-homopregn-4a-ene-4,20-dione.

5. 21-acetoxy-17α-hydroxy-3-oxa-A-homopregn-4a-ene-4,11,20-trione.

6. 17,20;20,21-bismethylenedioxy-2,11-dioxo-2,3-secopregn-4-en-3-oic acid.

No references cited.

UNITED STATES PATENT OFFICE
CERTIFICATE OF CORRECTION

Patent No. 3,128,282    April 7, 1964

Raphael Pappo

It is hereby certified that error appears in the above numbered patent requiring correction and that the said Letters Patent should read as corrected below.

Column 3, lines 59 to 75, the lower left-hand portion of the formula should appear as shown below instead of as in the patent:

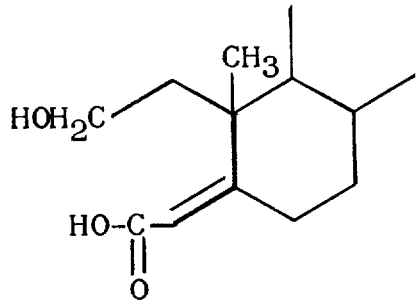

column 5, lines 55 to 65, the upper right-hand portion of the formula should appear as shown below instead of as in the patent:

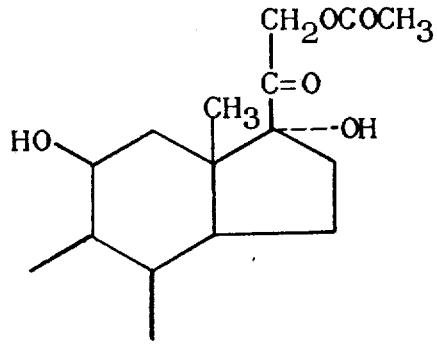

Signed and sealed this 28th day of July 1964.

(SEAL)
Attest:

ESTON G. JOHNSON
Attesting Officer

EDWARD J. BRENNER
Commissioner of Patents